United States Patent Office

Re. 26,545
Reissued Mar. 11, 1969

26,545

CONCRETE CONTAINING POROUS AGGREGATES

Robert J. Albert, Brookline, Mass. (% Eastern Fireproofing, Inc., 100 Foundry St., Wakefield, Mass. 01880)

No Drawing. Original No. 3,133,729, dated May 19, 1964, Ser. No. 201,239, June 11, 1962, which is a continuation of application Ser. No. 777,608, Dec. 2, 1958. Application for reissue May 4, 1966, Ser. No. 552,671
U.S. Cl. 259—147 15 Claims
Int. Cl. B28c *5/06;* C04b *7/00*

Matter enclosed in heavy brackets [ ] appears in the original patent but forms no part of this reissue specification; matter printed in italics indicates the additions made by reissue.

*ABSTRACT OF THE DISCLOSURE*

*A method of treating porous lightweight aggregate and permitting curing of a concrete mix wherein the aggregate is subject to a vacuum and the interior voids of the aggregate are filled with water. The aggregate is mixed with cement and mixing water and permitted to evaporate to cause a slow moist curing of the concrete mix from the inside out. The concrete mix contains a porous lightweight aggregate having all voids filled with an incompressible liquid.*

*This invention is a continuation of application Ser. No. 777,608, filed Dec. 2, 1958, and now abandoned and a reissue application of Patent No. 3,133,729, issued May 19, 1964.*

[This invention which is a continuation of application Serial No. 777,608 filed December 2, 1958, and now abandoned, relates to pumping concrete containing porous lightweight aggregates and more particularly comprises a new and improved method for treating the aggregate to make it readily pumpable.]

Great difficulty has been encountered in connection with pumping concrete containing porous lightweight aggregates made of expanded clays and shales, natural materials such as pumice, or by-products such as cinders and blastfurnace slag. Mixes which contain these materials, although plastic and mobile enough at atmospheric pressures, offer great resistance to pumping when heads of as little as 60 p.s.i. oppose their flow. It has also been found that when concrete mixes containing porous lightweight aggregates are subjected to high pressures for any purpose, they do not develop their expected compressive strengths when allowed to set. Some of these difficulties have severely limited the utility of lightweight concrete, particularly in the building of tall structures. Serious studies of these problems as discussed on page 77 of "Pumpcrete Practice" (1955 edition), published by Chain Belt Company of Milwaukee, Wisconsin have heretofore failed to offer a suitable solution.

The primary object of my invention is to provide a method for pretreating lightweight aggregates so as to make the concrete containing the aggregate readily stable under pressure and pumpable.

Another object of my invention is to avoid the harmful effects ordinarily encountered in the end product when concrete mixes containing lightweight aggregate are subjected to pressures appreciably above atmospheric conditions.

To accomplish these and other objects, my invention includes a method for pretreating the aggregates so that they are substantially incapable of absorbing mixing water and cement paste with which they are combined in the concrete mix. Tests have revealed that the difficulties developed in pumping the concretes containing the lightweight porous aggregates have resulted directly from the ability of the aggregate to absorb cement paste and mixing water.

The internal voids in the porous lightweight aggregate which normally contain gases are first evacuated in a closed system and thereafter the evacuated voids are filled with an incompressible fluid as water. The water introduced into the voids prevents the cement paste and mixing water from later entering the voids when the aggregate is combined with the other materials which make up the concrete mix. The water initially introduced into the voids in the aggregate enhances the end product for when the mix is later poured the water in the voids evaporates slowly and insures slow drying from the inside to the surface. Moreover, when the aggregate is treated as described, any mix mobile at atmospheric pressure remains equally mobile under applied pressure of any practical magnitude.

These and other objects and features of my invention will be better understood and appreciated from the following detailed description of several embodiments thereof. In order to gain a full appreciation of the invention, several experiments will be described below. These experiments related to a typical mix of structural lightweight concrete composed of 523 lbs. of cement, 1050 lbs. of sand, 900 lbs. of porous lightweight course aggregate and an agent to entrain approximately ten percent air by volume when mixing.

Experiment 1

To determine the effects of pressure upon the lightweight aggregate concrete described above, the mix was placed in a transparent Lucite cylinder having a four inch inner diameter. This mixture in the cylinder was subjected to pressure and the level of the fluids in the mix dropped immediately when the pressure was applied. The mix started to lose mobility. At 60 p.s.i., the fluids had substantially disappeared and the mix was immobile. At 150 p.s.i., there were no fluids apparent, and the mix acquired the appearance of point contact concrete. The coarse aggregate did not move when the vessel was inverted.

When the pressure was released from the cylinder, the fluids reappeared. Some segregation occurred and a frothy material rose to the surface of the mix. Thereafter, when the mix was allowed to set and dry, it failed to develop any appreciable compressive strength although the mix was designed to obtain a compressive strength of at least 2,500 lbs. per square inch.

The experiment indicated that the fluids in the mix were driven into the interior and surface voids of the aggregate as the applied pressure compressed the gases which ordinarily fill the voids under atmospheric conditions. The failure of the material to develop the expected compressive strength indicated that a substantial quantity of the cement paste remained in the voids after the pressure was released and as a result, there was insufficient binder available to hold the aggregate together.

Experiment 2

The transparent cylinder was filled to a height of 8½ inches with the porous lightweight course aggregate used in the above described mix. The material weighed 1125 grams loose dry. After weighing, the vessel was sealed and evacuated with an aspirator which generated 23 inches of vacuum. Because the gases which fill the voids are subject to the natural gas laws, it was concluded that approximately seventy-five percent of the gas in the voids had been evacuated. While under the vacuum, water was introduced into the cylinder until it reached a level three inches above the aggregate. A moderate amount of turbulence was noted. Thereafter, the vacuum was released.

Because only twenty-three inches of vacuum had been applied, it was assumed that not all of the gas had been displaced by the water. Therefore, 150 lbs. per square inch of air pressure was applied to the contents of the cylinder. Some bubbling occurred and the water level dropped approximately one inch. Thereafter, when the pressure was released and applied in cycles several times, no further change in the water level occurred.

When the material was removed from the cylinder, drained, and weighed, some fines were lost in the process but the drained weight of the material was 1335 grams. By accounting for the loss of fines, the experiment indicated that 210 grams of water had displaced an equivalent volume of gas. The material was then allowed to sit at 70° F. for twenty-four hours. After the period, the material weighed 1302 grams, indicating that 177 grams of water remained in the aggregate.

The experiment proved that the twenty-three inches of vacuum did in fact evacuate approximately seventy-five percent of the gas in the voids and thus, the gas in the voids complies with the gas laws. The gas occluded in the voids was squeezed out by the initial application of pressure and displaced by the water.

If lightweight aggregate is treated in this manner, it will not permit entry of either mixing water or cement paste into the aggregate voids when mixes of concrete containing lightweight aggregate are subjected to pressure. Therefore, mixing water later mixed with the aggregate, cement, sand and other materials will provide the necessary lubrication to permit pumping of the material. Moreover, when the mixture containing the pretreated aggregate is poured and allowed to set and dry, it will acquire its predicted compressive strength for the cement paste will not be absorbed in the voids. Rather, it will perform its intended function of binding the aggregate and sand. Further tests with the mix containing the aggregate proved these conclusions valid.

Experiment 3

To determine whether the application of pressure alone would cause the water to displace the gas in the voids, the following experiment was conducted. The four inch inner diameter cylinder was filled to a height of 8½ inches with the same aggregate used in Experiments 1 and 2. As stated above, the aggregate weighed 1125 grams. Water was added to the aggregate and filled the cylinder to a height three inches above the level of the aggregate. The contents of the cylinder was then subjected to 150 p.s.i. of pressure. Some bubbling was noted and the level of the water fell approximately two inches. When the pressure was released, the level of the water rose about one-half inch and during several additional cycles of pressure and relief, the water level dropped approximately one-half inch and recovered the same amount.

After this treatment, the material was drained and weighed. The drained weight of the material was 1285 grams, an increase of 160 grams over the loose dry weight. After the material sat for twenty-four hours in 70° F. air, the material weighed 1224 grams, indicating that 99 grams of water remained in the voids.

The experiment indicated that approximately seventy-five percent of the gas remaining in the surface saturated material was displaced by the first application of pressure as shown by the initial drop in the water level of two inches followed by the recovery of one-half inch. The remaining twenty-five percent of the occluded gas would not be displaced by the application of 150 p.s.i. as shown by the repeated drop in water level of one-half inch when pressure was reapplied and the subsequent recovery of the water level when pressure was released.

Experiment 4

To determine the relative quantities of water absorbed in the voids of the aggregate as compared to the water which would be absorbed at atmospheric pressure, an 8½ inch column of the aggregate was placed in the cylinder and weighed 1125 grams, as in the previous experiments. The aggregate was submerged in water in the cylinder for twenty-four hours and thereafter drained and weighed. After this treatment, the material weighed 1255 grams indicating that approximately 130 grams of water had been absorbed. It is apparent from this experiment that approximately one-half of the voids in the aggregate are unaffected by even the most thorough saturation and the gas remaining in the voids is more than sufficient to impair efforts to pump any mix containing a substantial volume of porous aggregate and to make problematical the quality of any concrete subjected to the pressures encountered in pumping.

Additional tests have revealed that the water which fills the interior voids is not readily available to the cement plaste while it is gelling and does not, therefore, impair the quality of the concrete. The concrete dies slowly as water evaporates from the mass giving the concrete a highly beneficial slow moist cure from the inside out. It will also be recognized that if hot water is used to fill the interior voids of the aggregate and the pretreatment occurs immediately before mixing, the heat is available to cause the cement paste to gell more quickly. This, of course, is an added benefit derived from the process. Moreover, if the water contained in the voids is frozen, it will have no effect on the concrete other than to retard drying.

Although the foregoing description has suggested that the interior voids of the aggregate should be filled with water, it is to be understood that other substantially noncompressible fluids may be employed so long as those used are compatible with the concrete chemistry. It is only necessary that the interior voids be filled with a fluid which prevents the mixing water and paste from entering them. The mixing water ordinarily used in the mixture will saturate the surface of the aggregate and make possible the maintenance of mobility necessary to pumping. The substantially incompressible fluid prevents the cement paste and mixing water from entering the interior voids while the mixing water saturates the surfaces and prevents the surface voids from absorbing any appreciable quantity of the paste. When the porous aggregate is treated in this manner, any mix mobile at atmospheric pressure is equally mobile under applied pressures of any practical magnitude. It should also be appreciated that the pretreatment of the aggregate is useful in preparing mixes containing porous materials for extrusion because the mix will not change its character under pressure. A change of character is impossible in view of the manner in which the aggregates have been treated.

In addition to making the ultimate mixture pumpable, the process has other applications. For example, a system has been developed for filling forms with aggregate and then filling them with grout. Some difficulty has been encountered due to the failure of the grout completely to fill the voids around and between the aggregate particles. If the mass is first evacuated, no voids can develop in the mass. The grout completely fills the voids as is desired. It will also be recognized that this process may be applied to precast concrete members and offers a means of achieving the most dense possible concrete with the maximum aggregate content.

In the foregoing description, I have described in detail my invention of pretreating the aggregates used in concrete. In the preferred method of my invention, the interior voids of the aggregate are first evacuated in a closed system and thereafter, water is introduced to the aggregate while the vacuum is maintained. Subsequently, pressure is applied to the mixture if necessary or desirable. The necessity for the application of additional pressure normally will be determined by the magnitude of the vacuum initially applied. As indicated in the experiments, when twenty-three inches of vacuum are generated, apprximately seventy-five percent of the gas in the voids is evacuated. Thus, to fill the voids, it is necessary to subject the mixture to a considerable pressure. Of course, the head to be encountered by the particular mix when later pumped or subjected to other treatment will determine the necessary amount of displacement of the gas by the incompressible fluid. When the head to be encountered is not appreciably above atmospheric pressures, it is possible to avoid the evacuation step and employ the treatment described in Experiment 3. It will be recalled that following that procedure, approximately seventy-five percent of the gases in the voids were displaced by water.

It will aso be appreciated that the method employed by applicant for pretreating the aggregate does not require unusual equipment. Rather, the equipment necessary to avacuate any chamber containing the aggregate and the equipment necessary to apply the necessary pressures to it may be built economically and are not of the type which are costly to operate.

The invention also contemplates a method of pumping concrete containing porous aggregates in which the interior voids are filled with an incompressible fluid as water without the need of using pressures above atmospheric pressures. In this embodiment dry or substantially dry aggregates are subjected to a high vacuum preferably at least approximately a thirty inch mercury vacuum. Lesser vacuums are possible but inferior results will be obtained. Vacuums below a twenty-three inch mercury vacuum are relatively ineffective. While under the vacuum an incompressible fluid as water is mixed with the aggregates and the vacuum is thereafter reduced preferably to atmospheric pressure, no pressure above atmospheric need be applied. This process replaces the gases in the interior voids with the fluid to make the aggregates stable and pumpable. The treated aggregates may thereafter be combined and mixed with sand, cement and mixing water and subjected to a pressure head for propelling the mix. Here too the fluid may be heated above room temperature for improved drying results. This method is adapted for a continuous process rather than a batch process.

Having described my invention, I claim:

1. A method of pumping concrete containing a porous lightweight aggregate comprising the steps of subjecting the aggregate to a vacuum thereby evacuating the interior voids of the aggregates, mixing water with the aggregate while maintaining the vacuum, next subjecting the mixture of water and aggregate to pressure above atmospheric pressure to replace the gases evacuated from the voids with water, and thereafter combining and mixing the aggregate with sand, cement and mixing water and next applying a pressure head to propel the mix.

2. A method as set forth in claim 1 wherein an air entraining agent is added to the aggregate with said sand, cement and mixing water.

3. A method of pumping concrete containing a porous lightweight aggregate having interior voids comprising the steps of mixing an incompressible fluid with said aggregate, subjecting the aggregate and fluid to a vacuum whereby gases in the interior voids of said aggregates are evacuated and said gases are replaced with said fluid, and thereafter combining and mixing said aggregate with sand, cement and mixing water and then applying a pressure head to propel the mix.

4. A method as set forth in claim 3 wherein said vacuum comprises at least substantially a twenty-three inch mercury vacuum.

5. A method as set forth in claim 3 wherein said fluid is heated above room temperature before mixing with said aggregates.

*6. A method of treating and curing a concrete mix comprising a porous lightweight aggregate, sand, cement and mixing water, said method comprising the steps of,*

*subjecting the aggregate to a vacuum and evacuating gases from the interior voids of the aggregate,*

*mixing water with the aggregate while maintaining the vacuum to replace gas evacuated from the voids with water,*

*combining and mixing the aggregate with sand, cement and mixing water,*

*and permitting said water to evaporate to cause a slow moist cure of said concrete mix from the inside out.*

*7. A method in accordance with the method of claim 6 wherein the mixture of water and aggregate are subjected to pressure above atmospheric pressure before said combining step.*

*8. The product formed by the method of claim 6.*

*9. A method in accordance with the method of claim 6 and further comprising the step of pumping said aggregate by applying a pressure head to propel the concrete mix after said combining and mixing step.*

*10. A method in accordance with the method of claim 6 wherein said aggregate and water are simultaneously subjected to said vacuum to evacuate gases from the interior voids of the aggregate and replace gases evacuated from the voids with water.*

*11. A concrete mix comprising a porous lightweight aggregate having substantially all external and internal voids filled with an incompressible liquid which leaves said voids upon setting and curing of said mix, said liquid having no cement paste therewith in said voids so as to leave said voids unfilled after said setting and curing.*

*12. A concrete mix in accordance with claim 11 and further comprising said liquid being water and said aggregate being mixed with cement, sand and mixing water which leaves said voids upon setting and curing of said mix, said liquid having no cement paste therewith in said voids so as to leave said voids unfilled after said setting and curing.*

*13. A method of treating porous lightweight aggregate and permitting curing of a concrete mix containing said aggregate, cement and mixing water, said method comprising the steps of,*

*subjecting the aggregate to a vacuum and evacuating gases from the interior voids of the aggregate,*

*mixing water with the aggregate while maintaining the vacuum to replace gas evacuated from the voids with water,*

*combining and mixing the aggregate with cement and mixing water,*

*and permitting said water to evaporate to cause a slow moist curing of said concrete mix from the inside out.*

*14. A method in accordance with the method of claim 13 and further comprising the step of pumping said aggregate by applying a pressure head to propel the concrete mix after said combining and mixing step.*

*15. A method in accordance with the method of claim 13 wherein said aggregate and water are simultaneously subjected to said vacuum to evacuate gases from the interior voids of the aggregate and replace gases evacuated from the voids with water.*

References Cited

The following references, cited by the Examiner, are of record in the patented file of this patent or the original patent.

UNITED STATES PATENTS

| | | |
|---|---|---|
| 886,768 | 5/1908 | DeBogory. |
| 2,167,156 | 7/1939 | Morrissey et al. |

| | | |
|---|---|---|
| 2,557,386 | 6/1951 | Lonier. |
| 2,593,492 | 4/1952 | Scripture. |
| 2,921,862 | 1/1960 | Sucetti. |

FOREIGN PATENTS

| | | |
|---|---|---|
| 7,096 | 1900 | Great Britain. |

OTHER REFERENCES

Lionel S. Marks: Mark's Handbook, McGraw-Hill, N.Y., 1930, third edition, p. 702.

ROBERT W. JENKINS, *Primary Examiner.*

U.S. Cl. X.R.

106—97, 98; 166—29; 259—148